US007044742B2

(12) United States Patent
Sumiya et al.

(10) Patent No.: US 7,044,742 B2

(45) Date of Patent: May 16, 2006

(54) EMERGENCY REPORTING APPARATUS

(75) Inventors: Koji Sumiya, Aichi (JP); Tomoki Kubota, Tokyo (JP); Koji Hori, Tokyo (JP); Kazuaki Fujii, Tokyo (JP)

(73) Assignee: Kabushikikaisha Equos Research, Tokyo (JP)

( * ) Notice: Subject to any disclaimer, the term of this patent is extended or adjusted under 35 U.S.C. 154(b) by 458 days.

(21) Appl. No.: 10/328,021

(22) Filed: Dec. 26, 2002

(65) Prior Publication Data

US 2003/0128123 A1 Jul. 10, 2003

(30) Foreign Application Priority Data

Dec. 26, 2001 (JP) ............................. 2001-394739
Mar. 22, 2002 (JP) ............................. 2002-081983

(51) Int. Cl.
*G09B 19/14* (2006.01)

(52) U.S. Cl. ...................... 434/305; 434/350; 434/362; 340/425.5

(58) Field of Classification Search .................. 434/30, 434/35, 38, 111, 118, 218, 219, 226, 236, 434/319, 305, 322, 350, 365; 340/573.1, 340/438, 425.5, 515, 426.19, 539.21, 945, 340/909; 704/270, 273; 701/1, 3, 29; 379/49; 235/462.49; 273/252; 455/456.3; 368/10; 705/26; 280/735; 707/104.1
See application file for complete search history.

(56) References Cited

U.S. PATENT DOCUMENTS 3,694,579 A * 9/1972 McMurray ................... 379/49
4,280,285 A * 7/1981 Haas ........................... 434/30
4,481,412 A * 11/1984 Fields ................... 235/462.49
4,673,356 A * 6/1987 Schmidt ...................... 434/35
5,002,283 A * 3/1991 Langham et al. ........... 273/252
5,351,194 A * 9/1994 Ross et al. ............... 455/456.3
5,415,549 A * 5/1995 Logg ........................... 434/38
5,416,468 A * 5/1995 Baumann ................. 340/573.1
5,513,993 A * 5/1996 Lindley et al. ............. 434/319
5,554,031 A * 9/1996 Moir et al. ................. 434/111
5,562,455 A * 10/1996 Kirby et al. ................ 434/226
5,679,003 A * 10/1997 Schwechel .................. 434/219
5,874,897 A * 2/1999 Klempau et al. ........ 340/573.1
5,933,080 A * 8/1999 Nojima .................. 340/426.19
5,977,872 A * 11/1999 Guertin ....................... 340/515
6,008,723 A * 12/1999 Yassan ........................ 340/438
6,114,976 A * 9/2000 Vian ........................... 340/945
6,166,656 A * 12/2000 Okada et al. ............ 340/573.1
6,262,655 B1 * 7/2001 Yoshioka et al. ........ 340/425.5
6,272,075 B1 * 8/2001 Paganelli et al. ............. 368/10
6,377,165 B1 * 4/2002 Yoshioka et al. ........ 340/425.5

(Continued)

FOREIGN PATENT DOCUMENTS

JP 05-005626 1/1993

(Continued)

*Primary Examiner*—Joe H. Cheng
(74) *Attorney, Agent, or Firm*—Bacon & Thomas, PLLC

(57) ABSTRACT

An emergency reporting apparatus is provided which is capable of easily acquiring passenger information necessary at the time of an emergency report and reporting as deputy for a passenger in the case of an emergency. The emergency reporting apparatus, in a training mode, simulates questions from an emergency rescue facility which will be addressed when an emergency situation occurs, and learns and stores the reply contents and response procedures. From the questions and replies, the emergency reporting apparatus automatically acquires the necessary passenger information. Then, the emergency reporting apparatus reports, as a deputy for the user, the passenger information acquired in the training mode when there is no reaction from the user at the time of an actual emergency.

8 Claims, 9 Drawing Sheets

U.S. PATENT DOCUMENTS

| | | | | |
|---|---|---|---|---|
| 6,426,693 | B1 * | 7/2002 | Inomata | 340/539.21 |
| 6,517,107 | B1 * | 2/2003 | Johnson et al. | 280/735 |
| 6,633,238 | B1 * | 10/2003 | Lemelson et al. | 340/909 |
| 6,643,493 | B1 * | 11/2003 | Kilgore | 434/350 |
| 6,694,234 | B1 * | 2/2004 | Lockwood et al. | 701/29 |
| 6,748,400 | B1 * | 6/2004 | Quick | 707/104.1 |
| 6,768,417 | B1 * | 7/2004 | Kuragaki et al. | 340/425.5 |
| 6,810,380 | B1 * | 10/2004 | Roberts et al. | 704/270 |
| 6,845,302 | B1 * | 1/2005 | Moretto | 701/3 |
| 2002/0107694 | A1 * | 8/2002 | Lerg | 704/273 |
| 2002/0188522 | A1 * | 12/2002 | McCall et al. | 705/26 |
| 2003/0093187 | A1 * | 5/2003 | Walker | 701/1 |
| 2004/0140899 | A1 * | 7/2004 | Bouressa | 340/573.1 |

FOREIGN PATENT DOCUMENTS

| | | | | |
|---|---|---|---|---|
| JP | 06-251292 | | | 9/1994 |
| JP | 10105041 | A | * | 4/1998 |
| JP | 2001160192 | A | * | 6/2001 |
| JP | 2001230883 | A | * | 8/2001 |
| JP | 2001256581 | A | * | 9/2001 |

* cited by examiner

FIG. 2

QUESTIONS IN TRAINING

| | QUESTION ITEM |
|---|---|
| COMMON | PLEASE TELL ME YOUR NAME |
| | PLEASE TELL ME YOUR SEX AND AGE |
| | DO YOU KNOW YOUR BLOOD TYPE? |
| | DO YOU HAVE ANY ALLERGIES TO SPECIFIC MEDICATION OR OTHER THINGS? |
| | DO YOU HAVE FAMILY DOCTOR? SO, PLEASE TELL ME YOUR DOCTOR'S NAME. |
| | ⋮ |
| SUDDEN ILLNESS | ARE YOU SUFFERING FROM A DISEASE NOW OR FROM A CHRONIC DISEASE? |
| | ARE YOU PRESENTLY TAKING MEDICATION? |
| | ⋮ |
| ACCIDENT | ARE YOU INJURED NOW (FROM BEFORE THE ACCIDENT) OR DISABLED? |
| | ⋮ |
| CONTACT POINT | |

FIG. 3

<table>
<tr><td>ID</td><td colspan="5"></td></tr>
<tr><td>NAME</td><td colspan="2"></td><td>DATE OF BIRTH</td><td colspan="2"></td></tr>
<tr><td>AGE</td><td colspan="2"></td><td>SEX</td><td colspan="2"></td></tr>
<tr><td>MARRIAGE</td><td colspan="2"></td><td>CHILDREN</td><td colspan="2"></td></tr>
<tr><td></td><td>ITEM</td><td colspan="4">DETAIL ITEM</td></tr>
<tr><td rowspan="8">LIKES AND TASTES DATA</td><td></td><td></td><td></td><td></td><td>· · ·</td></tr>
<tr><td></td><td></td><td></td><td></td><td>· · ·</td></tr>
<tr><td></td><td></td><td></td><td></td><td>· · ·</td></tr>
<tr><td></td><td></td><td></td><td></td><td>· · ·</td></tr>
<tr><td></td><td></td><td></td><td></td><td>· · ·</td></tr>
<tr><td></td><td></td><td></td><td></td><td>· · ·</td></tr>
<tr><td></td><td></td><td></td><td></td><td>· · ·</td></tr>
<tr><td>⋮</td><td>⋮</td><td>⋮</td><td>⋮</td><td></td></tr>
<tr><td rowspan="9">HEALTH CARE DATA</td><td>BLOOD TYPE</td><td colspan="4"></td></tr>
<tr><td>TAKING MEDICINE</td><td colspan="4"></td></tr>
<tr><td>TROUBLE AND CHRONIC DISEASE</td><td colspan="4"></td></tr>
<tr><td>INJURY</td><td colspan="4"></td></tr>
<tr><td>ALLERGY</td><td colspan="4"></td></tr>
<tr><td>FAMILY DOCTOR</td><td colspan="4"></td></tr>
<tr><td>DISABILITY</td><td colspan="4"></td></tr>
<tr><td>FAMILY DOCTOR</td><td colspan="4"></td></tr>
<tr><td>⋮</td><td colspan="4">⋮</td></tr>
<tr><td>CONTACT POINT</td><td>⋮</td><td colspan="4">⋮</td></tr>
</table>

FIG. 9

CONTESTS REPORTED IN DEPUTY REPORT

| | | |
|---|---|---|
| REPORTER NAME | APPARATUS REPORTS BY DEPUTY OR PASSENGER REPORTS | |
| TIME | ACCIDENT OCCURRENCE TIME OBTAINED FROM CAR NAVIGATION APPARATUS | |
| PLACE | ACCIDENT OCCURRENCE PLACE OBTAINED FROM CAR NAVIGATION APPARATUS | |
| INFORMATION ACQUISITION DATE AND HOUR | WHEN FOLLOWING PASSENGER INFORMATION ACQUIRED | |
| PASSENGER INFORMATION | NAME | PASSENGER NAME |
| | SEX | PASSENGER SEX |
| | AGE | PASSENGER AGE |
| | BLOOD TYPE | PASSENGER BLOOD TYPE |
| | TROUBLE AND DISEASE | PASSENGER TROUBLE AND DISEASE |
| | MEDICINE | WITH OR WITHOUT PASSENGER TAKING MEDIATION AND KIND AND NAME OF MEDICINE |
| | ALLERGY | WITH OR WITHOUT OF ALLERGY AND NAME OF ALLERGY |
| | INJURY | INJURY FROM BEFORE ACCIDENT |
| | DISABILITY | WITH OR WITHOUT DISABILITY |
| | HOSPITAL | WITH OR WITHOUT OF FAMILY DOCTOR AND PLACE AND DOCTOR'S NAME |
| | ⋮ | ⋮ |
| REPORT REASON | REPORT REASON SUCH AS MEETING ACCIDENT OR SUDDEN ILLNESS | |
| STATE | STATE OF VEHICLE (STOP, COLLISION, FALL, OR THE LIKE) IN ACCIDENT CASE<br>STATE OF PASSENGER (WITH OR WITHOUT CONSCIOUSNESS, WITH OR WITHOUT MOVEMENT, DROP IN BODY TEMPERATURE, AND SO ON) IN CASE OF SUDDEN ILLNESS | |
| ⋮ | ⋮ | |

EMERGENCY REPORTING APPARATUS

BACKGROUND OF THE INVENTION

1. Field of the Invention

The present invention relates to an emergency reporting apparatus, and more specifically, to an emergency reporting apparatus which makes a report to a rescue facility or the like when an emergency situation occurs.

2. Description of the Related Art

When a driver gets sick in a vehicle or an accident occurs, he or she usually reports to a rescue facility such as a fire station, a police station, or the like.

In an actual emergency, however, there is not always a person nearby, or the driver becomes unable to move, loses consciousness, or the like and thus cannot use a reporting apparatus in some cases. Besides, even if the driver can report to the rescue facility, he or she sometimes cannot accurately report his or her state.

Hence, it has been suggested to provide an emergency reporting apparatus with an emergency reporting switch to automatically report the occurrence of an emergency situation.

For example, the emergency reporting apparatus described in Japanese Patent Laid-Open No. Hei 5-5626 detects occurrence of an accident, estimates location of the accident, stores information for analyzing the accident, and reports the accident.

Japanese Patent Laid-Open No. Hei 6-251292, discloses an emergency reporting apparatus that transmits a report of vehicle information such as the present position and so on, based on the operation of an airbag at the time of collision of the vehicle.

Such an emergency reporting apparatus is disposed in a vehicle, so that when an emergency occurs, a call for rescue is issued by the user actuating the emergency reporting apparatus or by an automatic operation of the apparatus.

In a conventional emergency reporting apparatus, however, it is required to input driver information and vehicle information into the apparatus in advance, which is burdensome. Therefore, the driver is required, at the time of the emergency, to report the information which has not yet been input as the driver information. The driver, however, cannot effectively use the emergency reporting apparatus in some cases such as when he or she is at a low consciousness level, when communication is difficult because of pain, and so on.

Moreover, an apparatus which makes an emergency report through the operation of an airbag or the like, will not function to issue a report in the case of sickness in which there is nothing wrong with the vehicle, and thus the driver must make the report by himself or herself in the end. Also in this case, even if the driver, suffering from an acute pain, can make an emergency report, he or she is not always able to give all information accurately.

Moreover, when transmitting information about the driver and vehicle to a rescue facility, the driver cannot verify that the transmission has actually been received.

SUMMARY OF THE INVENTION

Accordingly, a first object of the present invention to provide an emergency reporting apparatus capable of easily collecting information necessary for an automatic report at the time of an emergency.

Further, it is a second object of the present invention to provide an emergency reporting apparatus capable of automatically reporting even when the passenger cannot respond at the time of an emergency.

Further, it is a third object of the present invention to provide an emergency reporting apparatus capable of easily training a user to make an emergency report through simulated questions and replies.

Further, it is a fourth object of the present invention to make it possible, when the emergency reporting apparatus automatically makes an emergency report, for a passenger to confirm the report.

To attain the first object the present invention provides an emergency reporting apparatus, which comprises training means for simulating a report to an emergency report destination based on an occurrence of an emergency; passenger information storage means for storing passenger information input by the passenger during the training; detection means for detecting an emergency involving the vehicle or a passenger; and passenger information transmission means for transmitting to an emergency report destination the passenger information stored in the passenger information storage means, responsive to detection of an emergency by the detection means.

To attain the second object the emergency reporting apparatus may further comprise a response capability judging means for judging whether the passenger is capable of responding to the emergency report destination, when the detection means detects an emergency, wherein the passenger information transmission means transmits the passenger information when the response capability judging means judges that the passenger is incapable of responding.

To attain the third object the training means may include question means for outputting one or more questions simulating an emergency situation; and answer receiving means for receiving an answer to the question output by the question means.

To attain the fourth object the emergency reporting apparatus the passenger information transmission means may include voice output means for outputting by voice in the vehicle both the passenger information transmitted to the emergency report destination and communications received from the emergency report destination.

BRIEF DESCRIPTION OF THE DRAWINGS

FIG. 2 is a table of questions used in a training mode of the embodiment of FIG. 1;

FIG. 3 is an explanatory view showing the configuration of driver's information in the emergency reporting apparatus;

FIG. 9 illustrates contents of a deputy report.

DETAILED DESCRIPTION OF THE PREFERRED EMBODIMENT

Figure 1:
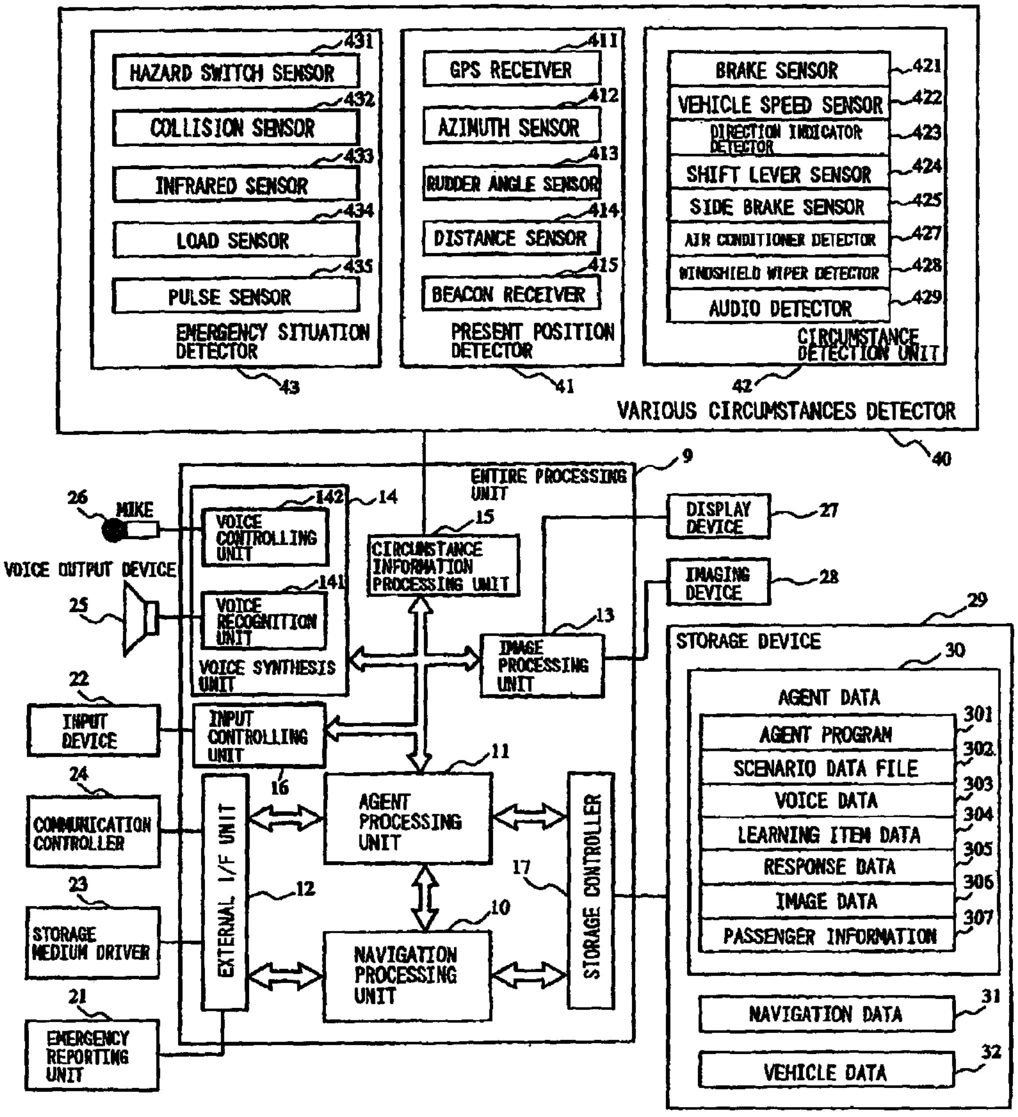
FIG. 1 is a block diagram of an emergency reporting apparatus in an embodiment of the present invention.

A preferred embodiment of an emergency reporting apparatus of the present invention is described in the following, with reference to the drawings.

The emergency reporting apparatus of this embodiment provides a training mode in which a user inputs information so that the emergency reporting apparatus learns and stores information pertaining to behavior of the user. This allows the emergency reporting apparatus to issue a deputy (automatic) report, based on the learned and stored contents, when there is no reaction of the user at the time of an actual emergency.

The emergency reporting apparatus includes, an emergency reporting switch for selecting an emergency report mode, and a training mode switch for selecting a training mode which simulates an emergency report. In the training mode, information is obtained by simulation of operation in the case of an emergency situation to enable training imagining circumstances based on an actual emergency. In the process of simulating an emergency report in the training mode, the emergency reporting apparatus learns and stores passenger information relating to the user. More specifically, the emergency reporting apparatus, in the training mode, asks the user questions simulating those received from an emergency rescue facility in an emergency situation, and learns and stores the reply contents and response procedures. From these questions and replies, the emergency reporting apparatus automatically acquires the passenger information.

The replies (passenger information) of the user to the questions may be converted into data based on voice recognition, or by using an input device such as a touch panel, keyboard, or the like.

When detecting an emergency situation of the vehicle or passenger, the emergency reporting apparatus makes an emergency report to a predetermined emergency report destination. When there is no reaction of the user, the emergency reporting apparatus transmits the appropriate stored passenger information to an emergency report destination in accordance with the type of emergency situation, thereby making a deputy report. Consequently, even when the user is in a state wherein he or she is unable to operate the emergency reporting apparatus, an emergency report can be automatically made according to desired procedures learned in the training mode.

Further, a voice report to an emergency report destination using an interface with a learning function and outputting of the voice report from an in-vehicle speaker allows the passenger to recognize that a reliable report has been made and to understand the transmitted information. The emergency reporting apparatus of this embodiment is configured to react to an emergency report to provide the training mode through display of an agent. This agent is an imaginary character displayed (planar image, three-dimensional image such as a holography, or the like) in the vehicle.

The agent apparatus performs the functions (hereafter referred to as deputy functions) of judging various conditions (including the state of the user) of the vehicle interior and the vehicle body, processing historical information, etc., and autonomously executing processes in accordance with the judgment result. The agent apparatus includes an interactive interface for conversation with the user (question to the user, recognition and judgment of reply of the user to the question, suggestion to the user, instruction from the user, and so on).

The agent apparatus performs various deputy functions including communication with the user through movement (display) and voice of the agent in the vehicle.

For example, responsive to pushing an emergency contact button by the user, the agent apparatus confirms the emergency report from the user by voice output of a question "Do you want to report an emergency?" and displays an image (moving image or still image) with a questioning expression on the face while pointing to the telephone and inclining the head.

Since the appearance of the agent changes, and voice is output for conversation with the user and execution of the deputy function by the agent apparatus as described above, the user feels as if the agent being the imaginary character exists in the vehicle. The execution of a series of deputy functions of the agent apparatus mentioned above will be described as behavior and movement of the agent.

The deputy functions executed by the agent apparatus include judgment of the circumstances of the vehicle including that of the vehicle body itself, passenger, oncoming vehicle, etc. and learning (including not only learning of the circumstances but also the responses and reactions of the passenger, and so on), in which the agent continuously deals (by behavior and voice) with variations in the circumstances of the passenger and vehicle, based on the results learned until then. This allows the passenger, at his or her pleasure, to call a plurality of agents into the vehicle and to chat (communicate) with them, thus making a comfortable environment in the vehicle.

The agent in this embodiment has the identity of a specific person, living thing, animated character, or the like, and the agent outputs motions and voice in such a manner as to maintain self-identity and continuity. The self-identity and continuity are embodied as a creature having a specific individuality, and this embodiment creates an agent with a voice and image in accordance with the learning history, even for the same type of emergency.

The agent performs various communicative actions in the emergency report mode and in the training mode.

Each action the agent performs, including the routine in an emergency, includes a plurality of scenarios. Each scenario is standardized and provides a series of continuing actions by the agent, and activating condition data for activating each scenario.

The agent apparatus of this embodiment as shown in FIG. 1 comprises a processing unit 9 which controls the entire communication function. The processing unit 9 includes a navigation processing unit 10 for searching for a route to a set destination and for guiding by voice and image display; an agent processing unit 11; an external VF unit 12 for the navigation processing unit 10 and agent processing unit 11; an image processing unit 13 for processing outputs of images such as agent images, map images, and so on, and inputted images; a voice controlling unit 14 for controlling output of voice such as agent voice, voice route guidance, and so on, and inputted voice; a circumstance processing unit 15 for processing various detected data for the vehicle and passenger; and an input control unit 16.

The navigation processing unit 10 and agent processing unit 11 each comprises a CPU (central processing unit) which performs data processing and controls the actions of other units including a ROM, RAM, timer, etc., all of which are connected to the CPU via a bus line such as a data bus, control bus, and the like. Both processing units 10 and 11 are networked so as to transfer data with each other.

After acquiring data for navigation (destination data, driving route data, and so on) from an external information center or the like, and after obtaining a destination through communication with a user, the agent processing unit 11 supplies this data to the navigation processing unit 10.

The ROM is a read only memory with prestored data and programs for the CPU to use in control, and the RAM is a random access memory used by the CPU as a working memory.

The navigation processing unit 10 and agent processing unit 11 of this embodiment are configured such that the CPU loads the various programs stored in the ROM to execute various routines. The CPU may download computer programs from an external storage medium using a storage medium driver 23, retrieve agent data 30 and navigation data 31 from a storage device 29 and write it into a not-shown another storage device, such as a hard drive or the like, and load a program from this storage device into the RAM for execution. Further, it is also possible to load a program from the storage medium driver 23 directly into the RAM for execution of a routine.

The agent processing unit 11 activates an agent for conversation with a passenger in accordance with a scenario which has been previously simulated for various kinds of circumstances (stages) of a vehicle and passenger. The circumstances which are regarded as scenario activation conditions include vehicle speed, time, driving area, temperature, residual quantity of gasoline, detection of an emergency situation, and selection of the emergency training mode, so that each circumstance has a scenario for behavior of the agent.

Each scenario is composed of a plurality of continuing scenes (stages). Thus, a scene is one stage in the scenario. For example, a question scenario, after an emergency report in this embodiment, is composed of scenes, in which the agent asks questions for collecting information for critical care.

Each scene has a title, list, balloon, background, and other units (parts). The scenes sequentially proceed in accordance with the scenario. Some scenarios have a plurality of scenes which are selected depending on replies of the passenger to questions asked in specific scenes, circumstances of the vehicle, and so on. In short, there are scenarios in which scenes branch in accordance with replies during the scenarios.

Data for a scenario including scenes is stored in a scenario data file 302. Information of defining when and where the scenario is to be executed (scene activation conditions), and data defining what image configuration is to be made in the execution, what action and conversation the agent takes, what instruction is given to a module of the navigation processing unit 10 and the like, and which scene the scenario proceeds to next are installed as groups for every scene in the scenario data file 302.

In this embodiment, various questions of the type used for collecting information for a patient are converted into scenario data as emergency questions to be asked based on known critical care procedure.

As shown in FIG. 2, questions commonly asked in the training mode are classified in accordance with accident, sudden illness, and so on. In other words, as shown in FIG. 2, the questions asked, irrespective of the type of emergency simulated in the training mode, include, for example, "Please tell me your name." "Please tell me your sex and age." "Do you know your blood type?" "Do you have any allergies to specific medication or other things?" "Do you have a family doctor? So, please tell me your doctor's name." and so on.

The questions asked in training for a "sudden illness" include, for example, "Are you suffering from a disease now or from a chronic disease?" "Are you presently taking medication?" and so on.

The questions asked in training for an "accident" include, for example, "Are you injured now (from a previous accident) or disabled?" and so on.

Further, the kinds of training include "disaster" and so on, though not shown, in addition to the above, and questions are predetermined for each type of training.

Then, the user's responses to the questions (the reply assigned to each key in the case of key entry, or the results as voice recognition in the case of voice entry) are obtained and stored as the passenger information.

In this embodiment, while these questions are asked each time the training mode is executed, to update data, the questions corresponding to acquired data may be omitted and questions may be limited to those items corresponding to unacquired data. Alternatively, it is also possible to classify questions into those to be asked every time, irrespective of the presence or absence of data acquisition, those to be asked only if directed to yet unacquired data, those to be asked periodically (every n times, or every time after a lapse of a predetermined period), and so on.

It should be noted that the questions shown in FIG. 2 represent only one example, and various technical questions required for critical care are also output in actual use.

This embodiment includes both an emergency report mode and a training mode. Accordingly, the emergency reporting unit 21 has an emergency reporting switch and a training mode switch to allow selection of either mode.

The emergency report mode is a mode for actually reporting to rescue facilities in the event of an accident, health problem of a passenger, sudden illness, or the like.

The training mode is a mode for the training user by simulation of use of the emergency reporting unit.

In FIG. 1, the external I/F unit 12 is connected with the emergency reporting unit 21, the storage medium driver 23, and a communication controller 24; the image processing unit 13 is connected with a display device 27 and an imaging device 28; the voice controlling unit 14 is connected with a voice output device 25 and a mike (voice capturing means) 26; the circumstance information processing unit 15 is connected with a detector 40; and the input controlling unit 16 is connected with an input device 22.

The detector 40 comprises a present location detector 41, an operation detection unit 42, and an emergency situation detector 43.

The present location detector 41 detects the present location of the vehicle, e.g., as an absolute position (in latitude and longitude), and uses a GPS (Global Positioning System) receiver 411 which determines the location of the vehicle using an artificial satellite, an azimuth sensor 412, a rudder angle sensor 413, a distance sensor 414, a beacon receiver 415 which receives location information from beacons disposed roadside, and so on.

The GPS receiver 411 and beacon receiver 415 can each independently determine position, but in locations where the GPS receiver 411 and beacon receiver 415 cannot receive information, the present location is detected by dead reckoning through use of both the azimuth sensor 412 and the distance sensor 414.

The azimuth sensor 412 may be for example, a magnetic sensor which detects earth magnetism to obtain the azimuth of a vehicle; a gyrocompass such as a gas rate gyro which detects the rotational angular velocity of a vehicle and integrates the angular velocity to obtain the azimuth of the vehicle, a fiber-optic gyro, or the like; right and left wheel sensors for detecting turning of the vehicle through the difference in output pulses (difference in distance moved) therebetween for calculation of change in azimuth, or the like.

The rudder angle sensor 413 detects the steering angle $\alpha$ through use of an optical rotation sensor, a variable resistor, or the like attached to a rotatable portion of the steering mechanism.

The distance sensor 414, may be a sensor which detects and counts the number of rotations of a wheel, or detects the acceleration and integrates it twice.

The distance sensor 414 and rudder angle sensor 413 also serve as driving operation detection means. In suggesting scenarios for simulation of an emergency situation, simulation of a vehicle collision is suggested when it is judged that the vehicle is, for example, in a crowded city, based on the present location detected by the present location detector 41.

The operation detection unit 42 comprises a brake sensor 421, a vehicle speed sensor 422, a direction indicator detector 423, a shift lever sensor 424, and a (parking brake) sensor 425, which serve as driving operation detection means for detecting the operations of the driver.

The operation detection unit 42 further comprises an air conditioner detector 427, a windshield wiper detector 428, and an audio detector 429, which serve as a device operation detection means for detecting the operation of such devices.

The brake sensor 421 detects whether a foot brake is depressed.

The vehicle speed sensor 422 detects the vehicle speed.

The direction indicator detector 423 detects the driver's operation of a direction indicator, and whether the direction indicator is blinking.

The shift lever sensor 424 detects the driver's operation of the shift lever, and the position of the shift lever.

The parking brake sensor 425 detects the driver's operation of the parking brake, and the state of the parking brake (on or off).

The air conditioner detector 427 detects a passenger's operation of various switches of the air conditioner.

The windshield wiper detector 428 detects operation of the windshield wiper.

The audio detector 429 detects operation of an audio device such as a radio, CD player, cassette player, or the like, and whether the audio device is outputting voice.

The circumstance detection unit 42 comprises, in addition to the above, a light detection sensor which detects the operation of lights such as headlight, a room light, and the like; a seat belt detection sensor which detects wearing and removal of a seatbelt at the driver's seat or assistant driver's seat; and other sensors, as a device operation circumstance detection means.

The emergency situation detector 43 comprises a hazard switch sensor 431, a collision sensor 432, an infrared sensor 433, a load sensor 434, and a pulse sensor 435. The hazard sensor 431 is configured to detect ON or OFF state and to communicate the detected information to processing unit 15. The information processing unit 15 supplies an emergency situation signal to a judging unit of the agent processing unit 11 when the switch remains ON for a predetermined time t or more.

The collision sensor 432 is a sensor which detects a vehicle collision. The collision sensor 432 is configured to detect a collision by detecting deployment of an airbag and to supply a detection signal to the information processing unit 15 in this embodiment.

The infrared sensor 433 detects body temperature to determine at least one of the presence or absence and the number of passengers in a vehicle.

A load sensor 434 is disposed in each seat of this vehicle and detects from the load on each load sensor 434 at least one of the presence or absence and the number of passengers in a vehicle.

The infrared sensor 433 and load sensor 434 serve as a passenger number detection means. While this embodiment includes both the infrared sensor 433 and load sensor 434, both utilized to detect the number of passengers in a vehicle, it may use only one of them.

The pulse sensor 435 detects the number of pulses per minute of a driver. This sensor may be attached, for example, to a wrist of the driver to transmit and receive the number of pulses by wireless. This sensor may also be mounted in the steering wheel.

The input device 22 also serves as one means for inputting passenger information, or for the passenger to respond to all questions and the like by the agent.

The input device 22 is used for inputting the point of departure at the time of start of driving and the destination (point of arrival) into the navigation processing unit 10, for sending a demand to an information provider for information such as traffic jam information and so on, the type (model) of a mobile phone used in the vehicle, and so on.

The input device 22 may be a touch panel (serving as a switch), keyboard, mouse, lightpen, joystick, remote controller using infrared light or the like, voice recognition device, etc. Further, the input device 22 may include a remote controller using infrared light or the like and a receiving unit for receiving various signals transmitted from the remote controller. The remote controller has various keys, such as a menu designation key (button), a numeric keypad, and so on, as well as a joystick which moves a cursor displayed on a screen.

The input controlling unit 16 detects data corresponding to the input contents received from the input device 22 and supplies the data to the agent processing unit 11 and navigation processing unit 10. The input controlling unit 16 detects an input operation is being performed, thereby serving as a device operation circumstance detection means.

The emergency reporting unit 21 comprises an emergency reporting switch for establishing emergency communication with a rescue facility when a passenger turns on this switch.

The communication with the rescue facility maybe established through a telephone line, dedicated line for ambulance, the Internet, etc.

In this embodiment, when an accident occurs, which is detected by the collision sensor 432 or the like, an emergency report is automatically made based on judgment of occurrence of an accident. Therefore, when the emergency reporting switch is pushed, which case is judged as an emergency circumstance because of a sudden illness, an emergency report is made.

Further, the emergency reporting unit 21 also includes a training mode switch, so that when this switch is turned on, the emergency reporting unit 21 operates for the user similarly to the case when the emergency reporting switch is pushed or when an emergency situation is detected. In this case, however, the emergency reporting unit 21 does not establish communication with a rescue facility but, rather, simulates an emergency situation.

In this embodiment, the emergency reporting unit 21 includes both the emergency reporting switch and the training mode switch so that the user may use either of them. It is also possible to provide the input device 22 with an emergency reporting key and training key as a dedicated button or keys of a touch panel, so that the training mode is designated in advance to allow the emergency report and the training mode to be activated by the same button.

The emergency reporting switch and training mode switch do not always need to be provided near the driver's seat. Instead, a plurality of switches can be set at positions such as the assistant driver's seat, rear seats and so on where the switches are considered necessary.

The storage medium driver 23 loads computer programs and data for the navigation processing unit 10 and agent processing unit 11 from an external storage medium.

The storage medium here represents a storage medium on which computer programs are recorded, and may be any magnetic storage medium such as a floppy disc, hard disc, magnetic tape, etc.; a semiconductor storage medium such as a memory chip, IC card, etc.; an optically readable storage medium such as a CD-ROM, MO, PD (phase change rewritable optical disc), etc.; a storage medium such as a paper card, paper tape, etc.; or a storage medium on which the computer programs are recorded by other various kinds of methods.

The storage medium driver 23 loads the computer programs from these various kinds of storage media. In addition, when the storage medium is a rewritable storage medium such as a floppy disc, IC card, or the like, the storage medium driver 23 can write into that storage medium the data and so on from the RAMs of the navigation processing unit 10 and agent processing unit 11 and from the storage device 29.

For example, data acquired in learning (learning item data and response data) regarding the agent function and the passenger information are stored in an IC card, so that a passenger may use data read from the IC card, for example, when traveling in another vehicle. This permits the passenger to communicate with the agent in a learning mode in accordance with his or her communications in the past. This enables the agent to utilize learned information specific to every driver or passenger.

The communication controller 24 is configured to be connected to mobile phones including various kinds of wireless communication devices. The communication controller 24 can communicate with an information provider which provides traffic information such as road congestion and traffic controls, or a provider which provides karaoke (sing-along machine) data used for online karaoke in a vehicle as well as calls via the telephone line. Further, it is also possible to transmit and receive learned information regarding the agent function and so on via the communication controller 24.

The agent processing unit 11 in this embodiment can receive via the communication controller 24 electronic mail with attachments.

Further, the agent processing unit 11 includes browser software for displaying homepages on the Internet (Internet websites) to be able to download data including scenarios from homepages via the communication controller 24.

This enables obtaining scenarios for use in the training mode for emergency reporting.

The communication controller 24 may self-contain a wireless communication function such as a mobile phone and the like.

The voice output device 25 is composed of one or a plurality of speakers disposed in the vehicle so as to output sounds and voice controlled by the voice controlling unit 14, for example, routing guidance by voice, normal conversation for communication between the agent and the passenger and questions for acquiring passenger information.

In addition, in this embodiment, when an emergency report is made and when the driver cannot communicate with an emergency report facility, the agent reports the deputy information stored in the passenger information, in accordance with response procedures learned in the training mode. The communication during the report in this case is also output by voice from the voice output device 25. This allows the passenger to recognize that a reliable report has been made and the information transmitted.

The voice output device 25 may be shared with a speaker for the audio device.

The voice output device 25 and voice controlling unit 14, in conjunction with the agent processing unit 11, serve as a question means for asking questions for acquiring passenger information.

The mike 26 serves as a voice input means for inputting and outputting voice which is processed for voice recognition in the voice controlling unit 14, for example, input voice of a destination for a navigation guidance routine, conversation of the passenger with the agent (including responses by the passenger), and so on. For the mike 26, a dedicated mike is used which is directional to ensure collecting the voice of the passenger.

The voice output device 25 and mike 26 may be in the form of a handsfree unit for telephone communication.

The mike 26 and a voice recognition unit 142 serve as a conversation detection means for detecting whether the driver is talking with his or her fellow passenger, in which case, the mike 26 and voice recognition unit 142 serve as a circumstance detection means for detecting the circumstances in the vehicle. More specifically, it is possible to detect from conversation of the passenger groaning, screaming, lack of conversation, and so on and to judge whether the passenger can make a report by himself or herself.

Further, the mike 26 and voice recognition unit 142 detect from conversation whether there is a fellow passenger and thereby serve as a fellow passenger detection means, and also serve as an ambulance crew arrival detection means for detecting arrival of an ambulance crew by recognizing an ambulance siren.

The display device 27 displays road maps for route guidance by the navigation processing unit 10 and other image information, and behavior (moving images) of the agent generated by the agent processing unit 11. Further, the display device 27 displays images of the inside and outside of the vehicle captured by the imaging device 28, after processing by the image processing unit 13.

The display device 27 is configured to display thereon a plurality of ambulance question scene images in which the agent takes on the appearance of an ambulance crew member who asks questions, a scene which is displayed after the completion of the questions and prior to arrival of an ambulance crew, and an image notifying the ambulance crew of the collected patient's information, in accordance with the ambulance question scenario of this embodiment. Further, the display device 27 serves to present displays suggested by a later-described suggestion means.

The display device 27, may be a liquid crystal display device, CRT, or the like. Further the display device 27 can be provided with an input device 22 such as, for example, a touch panel or the like.

The imaging device 28 is composed of cameras, each provided with a CCD (charge coupled device) for capturing images, and includes an in-vehicle camera for capturing images of the interior of the vehicle as well as exterior vehicle cameras for capturing images of the front, rear, right, and left of the vehicle. The images captured by the cameras of the imaging device 28 are supplied to the image processing unit 13 for image recognition.

In this embodiment, the agent processing unit 11 judges, based on the image recognition by the image processing unit 13, the state (condition) of the passengers from their movement in the vehicle captured by the in-vehicle camera. More specifically, the agent processing unit 11 judges the state (condition) of the passenger such as whether he or she can report by himself or herself and whether he or she can move by himself or herself, based on judgment criteria for movement (normal movement, no movement, convulsions, or the like), posture (normal, bending backward, crouch, or the like), others (vomiting of blood, turning up of the whites of the eyes, foaming at the mouth, or the like).

Further, the results of image recognition (the presence of a fellow passenger, the recognition of driver, and so on) by the image processing unit 13 are reflected in the communications by the agent.

The agent data 30, the navigation data 31, and vehicle data 32 are stored in the storage device 29 as the data (including programs) necessary for implementation of the various agent functions and of the navigation function.

The storage device 29 may be any of various kinds of storage media with respective drivers such as, for example, a floppy disc, hard drive, CD-ROM, optical disc, magnetic tape, IC card, optical card, DVD (digital versatile disc), and so on.

In this case, it is also possible to adopt, as the storage device 29, a plurality of different storage media and drivers such that learning item data 304, response data 305, passenger information 307 may be provided in the form of an IC card or a floppy disc which is easy to carry, and other data are stored in a DVD or a hard drive disc, and to use those storage media as drivers.

The agent data 30 includes an agent program 301, a scenario data file 302, voice data 303, the learning item data 304, the response data 305 composed of voice data, the image data 306 for images displaying the appearance and behavior of the agent, the passenger information 307, and other various other types of data necessary for processing by the agent.

The agent program 301 is a program for implementing the agent function.

Stored processing programs include, for example, a condition judgment routine for judging whether an activating condition for a scenario is satisfied; a scenario execution routine for activating, when the activation condition is judged to be satisfied in the condition judgment routine, the scenario corresponding to the activation condition and causes the agent to act in accordance with the scenario; and various other types of routines.

The learning item data 304 and response data 305 are data obtained as the result of the agent learning through the responses and the like of the passenger.

Therefore, the learning item data 304 and response data 305 are updated (learned) and stored for every passenger.

The stored learning item data 304 includes, for example, the total number of times the ignition switch is turned ON, the number of times turned ON per day, the residual fuel amount at the time of the last five fuel purchases, and so on. Correlated with the learning items included in this learning item data 304 are, for example, the greetings of the agent which change depending on the number of times the ignition is turned ON, or suggestions by the agent for refueling when the residual fuel amount decreases to an average value or less of the residual fuel amounts at the last five refills.

The response data 305 includes a response history of responses by user to the behavior of the agent in each scenario. The stored response data 305 further includes response dates and hours and response contents for a predetermined number of responses, for every response item. The response contents, include respective cases of lack of a response, refusals, acceptances, and so on, which are judged based on voice recognition in each case or on the inputs into the input device 22. Further, in the training mode, simulating an emergency situation, the responses by the passenger are stored in the response data 305.

The scenario data file 302 contains data for scenarios defining the behaviors of the agent at the respective circumstances and stages, and also contains the ambulance question scenario (question means) which is activated at the time of an emergency report or at the time of simulation of an emergency report. The scenario data file 302 in this embodiment is stored in a DVD.

In the case of the ambulance question scenario, ambulance crew questions about the state of the passenger are asked for every scenario, and respective replies to the questions are stored as passenger information 307.

The voice data 303 in the storage device 29 (FIG. 1) includes voice data for the agent's conversation with the passenger in accordance with scenes of a selected scenario. The voice data also includes the ambulance crew questions by the agent.

Each item of the voice data 303 is correlated with character action data in the scene data.

The image data 306 is utilized to form images representing the state of the agent in each scene of a given by a scenario, moving images representing actions (animation), and so on. For example, such images include moving images of the agent bowing, nodding, raising a right hand, and so on. These still images and moving images have assigned image codes.

The appearance of the agent provided by the image data 306 is not necessarily human (male or female) appearance. For example, an inhuman agent may have the appearance of an animal such as an octopus, chick, dog, cat, frog, mouse, or the like; an animal appearance deformed into a human being; a robot-like appearance; an appearance of a floor stand or tree; an appearance of a specific character; or the like. Further, the agent is not necessarily at a certain age, but may have a child appearance at the beginning and change in appearance following growth with time (changing into an appearance of an adult and into an appearance of an aged person) as the learning function of the agent. The image data 306 includes images of appearances of these various kinds of agents to allow the driver to select one through the input device 22 or the like, in accordance with his or her preferences.

The passenger information 307, which is information regarding the passenger, is used for matching the behavior of the agent to demands and likes, tastes of the passenger when suggesting a simulation of an emergency situation.

FIG. 3 schematically shows the configuration of the passenger information 307. As shown in FIG. 3, the passenger information 307 includes passenger basic data composed of passenger's ID (identification information), name, date of birth, age, sex, marriage (married or unmarried), children (with or without, the number, ages); likes and tastes data; health care data; and contacts.

The likes and tastes data is composed of major items such as sports, drinking and eating, travel, and so on, and detail data is included in these major items. For example, the large category of sports stores details data such as a favorite soccer team, a favorite baseball club, interest in golf, and so on.

The health care data includes data for health care stores, a chronic disease, the name and condition of the disease, the name of family doctor, and so on, for use in suggesting simulation and for questions during the simulation. The storage of passenger information as described above is regarded as a passenger information storage means in the present invention. The information stored in the health care data corresponds to the questions shown in FIG. 2, so that replies to the questions are also stored therein. The health care data shown in FIG. 3 represents one example, and questions are asked including more details in FIG. 2 so that the replies are stored therein.

In this embodiment, these pieces of passenger information have a predetermined order of priority, so that the agent asks questions to the passenger in descending order of the priorities of unstored pieces of passenger information. The passenger basic data is at a higher priority than the likes and tastes data. Note that the health care data have no priority, and the questions are asked in the training mode for an emergency report.

The passenger information 307 is created for each passenger when there are a plurality of passengers. Then, a passenger is identified, and corresponding passenger information is used.

For identifying a passenger, an agent common for all passengers appears to question the passengers, for example, when the ignition is turned ON to identify the individual passenger based on his/her replies. The questions are asked by displaying buttons on the display device for selection from among inputted passenger names and "other" and outputting voice to urge the passengers to make a selection. When "other" is selected, a new user registration screen is displayed.

It is also possible to include in the passenger information 307 at least one piece of information specific to a passenger such as weight, fixed position of the driver's seat (position in the front-and-rear direction and angle of the seat back), angle of a rearview mirror, height of sight, data acquired by digitizing his or her facial portrait, voice characteristic parameter, and so on, so as to identify a passenger based on the information.

The navigation data 31 includes various data files for use in route guidance and the like, a communication area data file, picturized map data file, intersection data file, node data file, road data file, search data file, photograph data file, and so on.

The communication area data file contains communication area data for display on the display device 27 the service area within which a mobile phone, with or without the communication controller 24, can communicate, or for using the service area for route searching, on a mobile phone basis.

The picturized map data file contains picturized map data for presenting map pictures on the display device 27. The picturized map data data for a hierarchy of maps, for example, maps for Japan, Kanto District, Tokyo, and Kanda, in this order. The map data at respective hierarchies are assigned respective map codes.

The intersection data file contains intersection data such as a number assigned to identify each intersection, name of intersection, coordinates of intersection (latitude and longitude), number of roads which start or end point is at the intersection, and the presence of traffic light.

The node data file contains node data composed of information such as a longitude and latitude designating coordinates of each node (point) on each road. More specifically, a node is regarded as one point on a road, so that assuming that the nodes are connected in an arc, a road is expressed by connecting a plurality of node strings with arcs.

The road data file stores road numbers for identifying each road, number of an intersection which is a start or end point, numbers of roads having the same start or end point, width of road, prohibition information regarding entry prohibition or the like, number assigned to a photograph of later-described photograph data, and so on.

Road network data composed of the intersection data, node data, and road data respectively stored in the intersection data file, node data file, road data file is used for route searching.

The search data file contains intersection string data, node string data and so on, constituting routes created by route searching. The intersection string data includes information such as name of intersection, number of intersection, number of photograph capturing a characteristic view of the intersection, corner, distance, and so on. The node string data is composed of information such as east longitude and north latitude indicating the position of the node.

The photograph data file contains photographs capturing characteristic views at intersections and during going straight, in digital, analogue, or negative film form, with corresponding numbers.

The emergency reporting function of the agent apparatus includes an emergency report mode for making an emergency contact when an emergency situation actually occurs, and a training mode for training in operation and dealing with the emergency report mode. The emergency report mode includes a normal report mode in which a passenger communicates with an emergency report facility, and a deputy report mode in which an agent reports as a deputy when the passenger cannot respond, such as when he or she is unconscious.

Note that, for efficient training, the interfaces used in the training mode are the same as those used in an actual emergency.

Emergency Report Mode

The emergency report mode is used in the case in which a person asks for help from a rescue facility because an emergency situation has actually occurred, such as when the driver or passenger becomes ill during driving, when a landslide is encountered, when involved in a vehicle collision, etc.

Figure 4A:
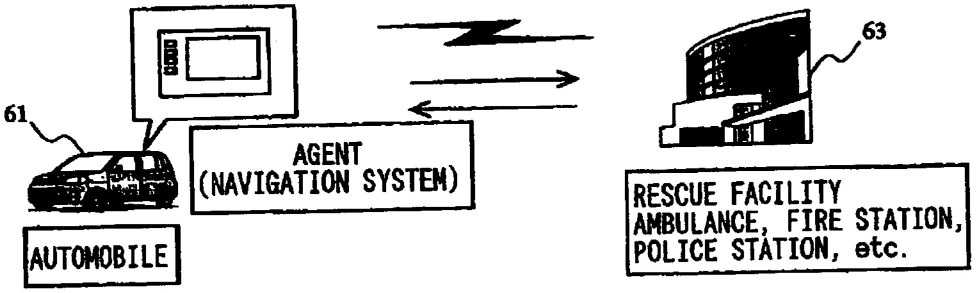
FIGS. 4A and 4B are views illustrating communication between an automobile and a rescue facility.
Figure 4B:
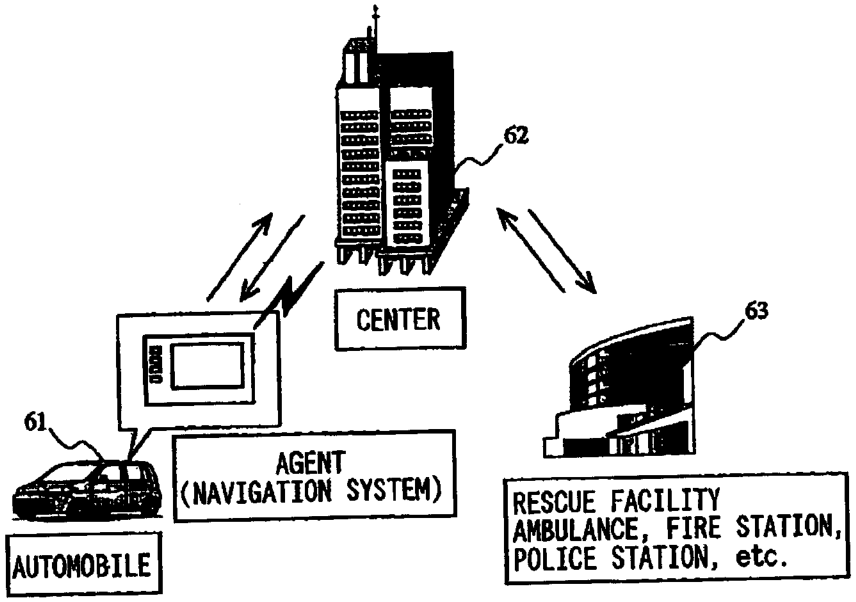

FIGS. 4A and 4B are diagrams showing the communication between an automobile and a rescue facility, FIG. 4A shows the case in which the automobile directly communicates with the rescue facility, and FIG. 4B shows the case in which the automobile communicates with a center which contacts the rescue facility.

In FIG. 4A, the automobile 61 is a vehicle equipped with the agent apparatus of this embodiment. The rescue facility 63 is a facility which provides rescue services when an emergency occurs with the automobile 61, for example, a fire station, police station, private rescue facility, etc.

When the automobile 61 encounters an emergency and its driver turns on the emergency reporting switch in the emergency reporting unit 21 (FIG. 1), the agent processing unit 11 establishes wireless communication between the communication controller 24 and the rescue facility 63. This communication may be by the emergency reporting unit 21, the telephone line or a dedicated communication line.

When receiving a report from the agent apparatus, the rescue facility 63 confirms the emergency situation with the reporter, and dispatches a rescue party to the automobile 61 when necessary.

The emergency report network shown in FIG. 4B is composed of the automobile 61 with the agent apparatus, the center 62, and the rescue facility 63. As shown in FIG. 4B, when an emergency situation occurs and the emergency reporting switch is selected, an emergency report is sent to the center 62. In the center 62, an operator in charge is assigned to deal with the passenger in extracting the necessary information.

As described above, this embodiment includes an emergency report mode to report from the emergency reporting unit 21 of automobile 61 to the center 62. The report is sent to either the rescue facility 63 or the center 62.

It is also possible to contact the contact points such as home, acquaintances, relatives, and so on, or a predetermined email address obtained in the training mode. It is also possible to contact the contact point as well as or in place of the report destination.

Figure 5:
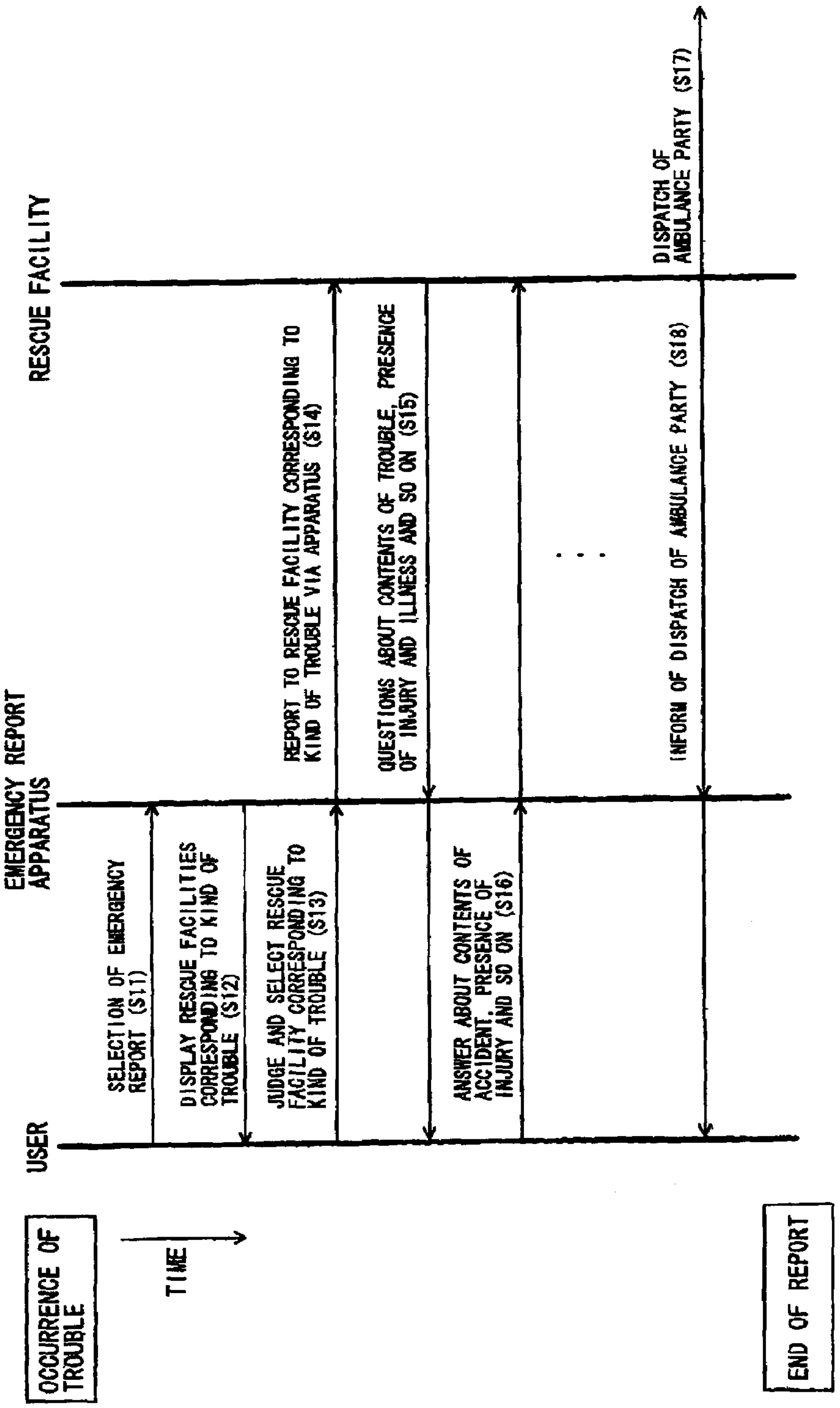
FIG. 5 is a timeline of actions of a user, the emergency reporting apparatus and the rescue facility in normal operation of the emergency report mode.

FIG. 5 is a flowchart of actions of the user, the emergency reporting apparatus (the agent processing unit 11 of the agent apparatus), and the rescue facility in the normal emergency report mode shown in FIG. 4A.

In execution of this normal mode, need for a deputy report is judged as described later, and when the deputy report is judged to be unnecessary, the following normal mode is executed. Here, the processing in the normal mode will be described first for facilitating an understanding of the training mode.

When an emergency occurs, a driver or passenger (assuming that the driver performs the operation) turns on (selects) the emergency reporting switch of the emergency reporting unit 21 (Step 11). When the emergency reporting switch is turned on, the agent apparatus is activated in the emergency report mode. Alternatively, circumstances detector 40 detects an abnormal situation (for example, the collision sensor 432 detects a collision), and the agent processing unit 11 automatically activates in the emergency report mode. As described above, the detection of a vehicle emergency or a passenger emergency situation is regarded as a function of the detection means of the present invention.

Then, the agent processing unit 11 generates a display on the display device 27 of selectable rescue facilities for dealing with various emergencies, such as fire station, police station, and specific private rescue facility (Step 12).

It is also possible to display, instead of rescue facilities, emergencies such as sudden illness, accident, disaster, and so on, to be selectable. In this case, the kinds of emergencies displayed are made to correspond to rescue facilities, for example, the fire station in the case of a sudden illness, the police station in the case of an accident, and so on, so that a selection of the type of emergency serves to specify the rescue facility dealing therewith.

The passenger selects a rescue facility corresponding to the type of emergency from among the displayed rescue facilities, and inputs it via the input device 22 (Step 13).

The selection of the rescue facility can be automatically made by the agent processing unit 11. In this case, the agent processing unit 11 guesses the type of emergency from the signal of the circumstances detector 40, and specifies a rescue facility. For example, when detecting a collision, the agent processing unit 11 reports to the police station, and further reports to the fire station when there is no response to the question "Are you all right?" or when there is confirmation of a response regarding a request for an ambulance.

Alternatively, the agent processing unit 11 may wait for input from the passenger for a predetermined period, and then automatically selects a rescue facility when there is no input. Thus when the driver is unconscious, the passenger makes a selection, and when the passenger loses consciousness, the agent processing unit 11 makes a selection as deputy for the passenger.

Next, the agent processing unit 11 establishes communication with the selected rescue facility using the communication controller 24, and starts a report to the rescue facility (Step 14).

In the rescue facility, an operator in charge deals with the report. The passenger can speak to the operator using the mike 26 and hear questions from the operator issued from the voice output device 25.

The questions that the operator asks the passenger such as the nature of the emergency, occurrence of injury or illness, and present position are transmitted from the rescue facility to the agent apparatus. Then, the agent processing unit 11 outputs the questions from the operator using the voice output device 25 (Step 15).

Then, the agent processing unit 11 obtains answers from the passenger to the questions asked by the operator, such as the nature of the accident, the presence of an injury and so on, through the mike 26, and transmits it to the rescue facility using the communication controller 24 (Step 16).

The agent processing unit 11 repeats the above Steps 15 and 16 until the operator acquires necessary information.

The operator extracts the necessary information from the passenger and then orders an ambulance party to the scene (Step 17), and informs the passenger of the dispatch of the ambulance party (Step 18).

(ii) The Training Mode

The training means of the present invention simulates a report to the emergency contact point based on the emergency situation. Further, the questions as shown in FIG. 2 are asked to obtain replies thereto in the training mode, so as to automatically acquire the passenger information with less load on the user.

While the operator in the rescue facility deals with the passenger in the emergency report mode, the agent processing unit 11 asks, in the training mode, the questions as deputy for the operator in accordance with a predetermined scenario (a scenario imagining the operator in the rescue facility dealing with the passenger).

Figure 6:
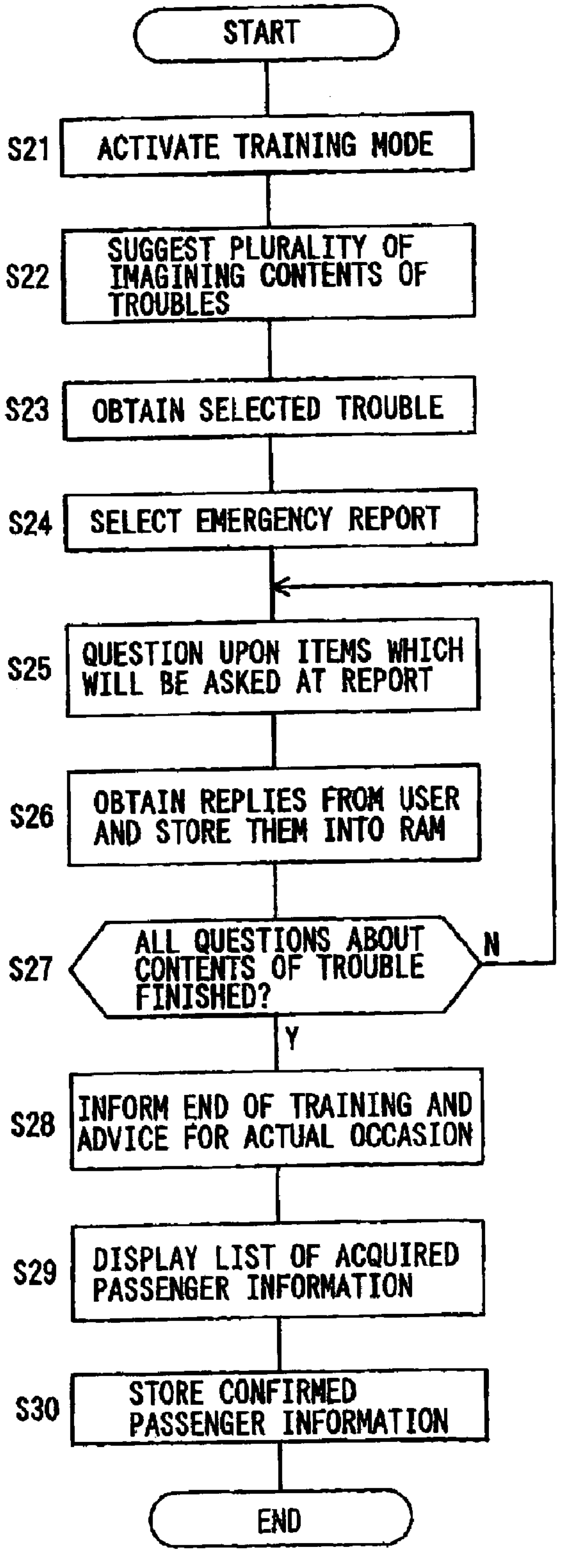
FIG. 6 is a flowchart of a training program.

FIG. 6 is a flowchart of operation of the agent apparatus in the training mode. FIGS. 7A to 7G show one example of scenes displayed on the display device 27 in the training mode. These scenes are included in the training scenario.

Referring now to FIG. 6 and FIGS. 7A to 7G, the passenger turns on the training mode switch in the emergency reporting unit 21 to thereby select the training mode. When the training mode is selected by the passenger, the agent apparatus activates the training mode (Step 21). As described above, the training mode is activated by the passenger requiring the agent apparatus to execute the training mode.

Figures 7A, 7B, 7C, 7D, 7E, 7F, 7G:
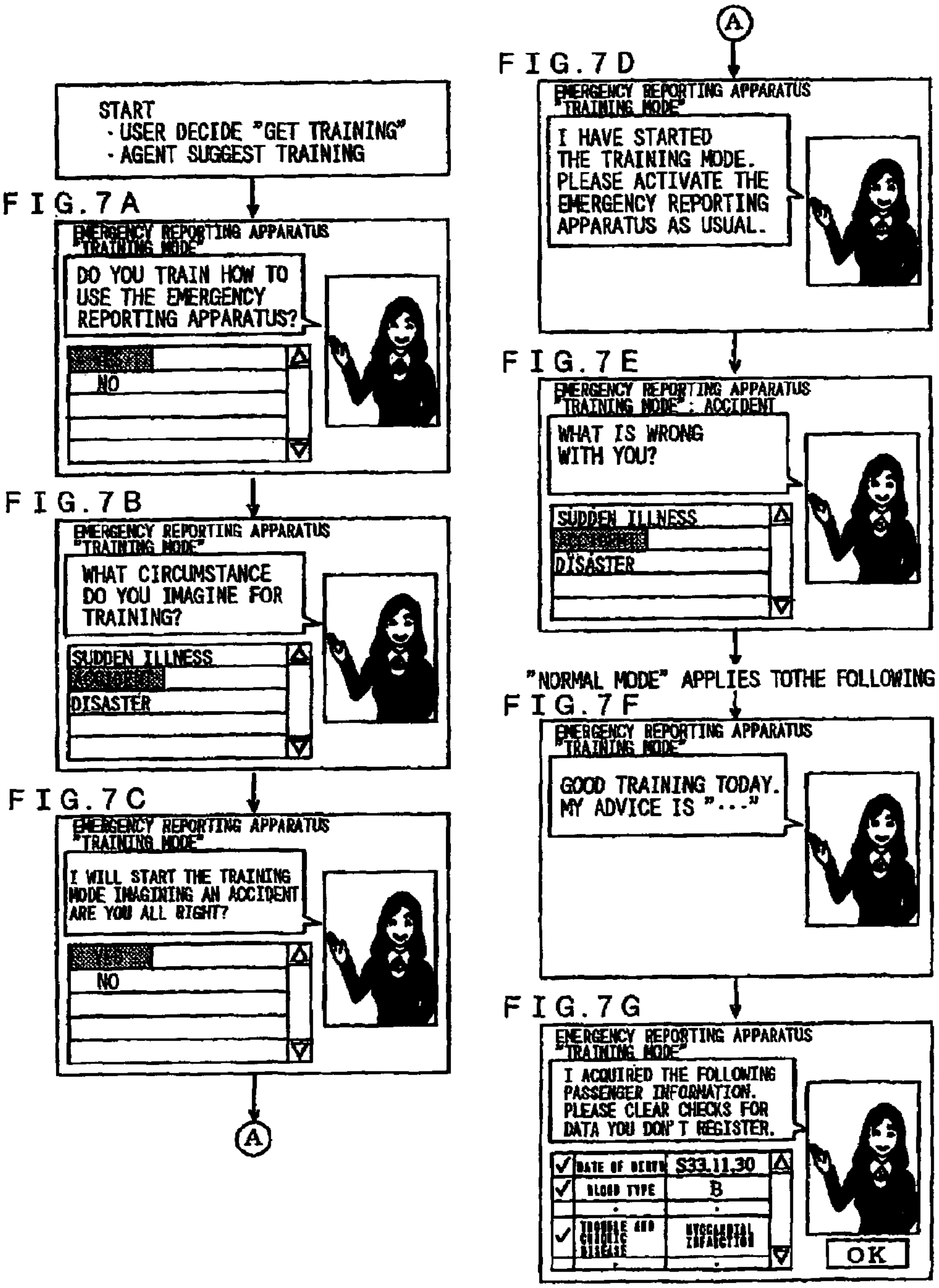
FIGS. 7A to 7G show examples of scenes displayed on a display device in the training mode.

FIG. 7A is an example of a selection screen that the agent processing unit 11 displays on the display device 27. On the selection screen, an agent is displayed with a balloon "Do you start the training mode?" Further, the agent processing unit 11 announces in the vehicle from the voice output device 25 the same message as the balloon of the agent.

The confirmation by the passenger as described above permits the passenger to use the training function at ease and to avoid confusion in a real emergency report.

On the selection screen, "Yes" and "No" are displayed in such a manner that the selection can be recognized, for example, one of them is highlighted or displayed in reverse video. "Yes" or "No" can be selected by the passenger via the input device 22 or by voice. Although not shown, when the passenger pushes a decision button on the input device 22, the agent processing unit 11 decides the selection and proceeds with the appropriate routine.

When "Yes" is selected, the agent processing unit 11 starts the training mode, and when "No" is selected, the agent processing unit 11 ends the training mode.

Although not shown, when "Yes" is selected, the agent is displayed on the display device 27 accompanied by an announcement in the vehicle "Training mode is selected." whereby the agent declares the start of the training mode.

Returning to FIG. 6, when the training mode is selected, the agent processing unit 11 suggests, in the alternative, a plurality of possible situations such as sudden illness, accident, and so on, and displays same (Step 22).

When the passenger selects from among the displayed plurality of listed emergencies, the agent processing unit 11 identifies the selected emergency (Step 23). The suggestion and selection from among the displayed emergencies is regarded as item selection means of the present invention.

Then, the scenario branches out into the training for a sudden illness, an accident, and so on, depending on the type of emergency selected by the passenger.

It should be noted that the training mode may allow the passenger to select a rescue facility instead of type of emergency, and the passenger will then remember the selected rescue facility, so that he or she will make an emergency report to the previously selected rescue facility when the same emergency situation as dealt with in the training actually occurs.

FIG. 7B shows an example of an emergency identification screen that the agent processing unit 11 displays on the display device 27 when "Yes" is selected on the selection screen in FIG. 7A.

On the emergency identification screen, the agent is displayed with a balloon "What circumstance do you imagine for training?" Further, the agent processing unit 11 announces through the voice output device 25 the same message as the balloon of the agent.

The emergency identification screen further displays a list of possible emergencies such as "sudden illness" "accident" "disaster" etc., displayed in such a manner that the selection can be recognized. The driver can select the type of emergency via the input device 22. Although not shown, when the driver pushes the decision button on the input device 22, the agent processing unit 11 decides the selection and proceeds to the indicated subsequent processing.

As described above, the passenger can set whatever circumstances he or she imagines.

Further, the agent processing unit 11 can also suggest, in conjunction with the navigation, the possibility of an accident at the location where the passenger performs training, based on the information acquired from the present position detector 41. The present position detector 41 is regarded as a present position information detection means.

Suggested emergency situations corresponding to the present location of the vehicle might include, for example, a fall and a slide in an uneven location. The suggested examples might also include a collision in an overcrowded city and a spin out due to excessive speed at a place with a wide space.

Returning to FIG. 6, when the passenger makes a selection from the trouble suggestion screen, the agent processing unit 11 reconfirms whether the passenger is satisfied with the selection, and thereafter instructs the passenger to send the emergency report. Following the instruction by the agent processing unit 11, the passenger activates the emergency reporting unit 21 (Step 24). As described above, in the training mode, report to a rescue facility is prohibited, so that no report is made even if the emergency reporting switch is turned on.

FIG. 7C shows a confirmation screen which the agent processing unit 11 displays on the display device 27 when confirming arrangement by the passenger to the procedure executed in accordance with the description of the emergency selected.

On the confirmation screen, the agent might be displayed for example with a balloon "I will start the training mode imagining an accident. Are you all right?"

Further, the agent processing unit 11 announces from the voice output device 25 the same message as the balloon of the agent.

On the selection screen, "Yes" and "No" are displayed in such a manner that the selection of one can be recognized. For example, one of them is highlighted. "Yes" or "No" can be selected by the passenger via the input device 22 or by voice. Although not shown, when the passenger pushes the decision button on the input device 22, the agent processing unit 11 decides the selection and proceeds to the subsequent processing.

When "Yes" is selected, the agent processing unit 11 proceeds with processing in accordance with the selected trouble/emergency, and when "No" is selected, the agent processing unit 11 again displays the trouble selection screen to urge the passenger to make another selection.

FIG. 7D shows an example of an activation instruction screen generated by the agent processing unit 11 to instruct the passenger to activate the emergency reporting apparatus.

On the activation instruction screen, the agent is displayed with a balloon "I have started the training mode. Please activate the emergency reporting apparatus as usual."

Further, the agent processing unit 11 announces in the vehicle from the voice output device 25 the same message as the balloon of the agent.

As described above, after confirmation of the start of the training mode, the passenger pushes the activation button of the emergency reporting unit 21, that is, the emergency reporting switch, as usual.

Returning to FIG. 6, when the passenger activates the emergency reporting unit 21 by pushing the emergency reporting switch, the agent processing unit 11 outputs from the voice output device 25 voice imitating the operator in a rescue facility to ask questions, for example, "What is wrong with you?" "Is anybody injured?" and so on, to learn if an injury has occurred, present location, and other information necessary for emergency care as shown in FIG. 2 (Step 25). The output of one or a plurality of questions imagining an emergency situation such as the questions by the operator in the rescue facility and so on is regarded as a question means of the present invention.

FIG. 7E is a view showing an example of a question screen generated by the agent processing unit 11 after the passenger activates the emergency reporting unit 21. Note that this screen assumes occurrence of an accident.

On the question screen, the agent is displayed with a balloon "What is wrong with you?" Further, the agent processing unit 11 announces in the vehicle from the voice output device 25 the same message as the balloon of the agent.

It is also possible to display in list form the imagined emergency situations for the passenger to select from among them an appropriate emergency state. It is also possible to use both the selection from the list display and an answer by voice (explaining the emergency situation).

In answer to the questions from the agent announced in the vehicle via the voice output device 25, the passenger answers "I have a crisis." "I bumped into the guardrail." or the like. Further, the agent processing unit 11 asks in sequence the questions which will be asked of the passenger from a rescue facility at the time of a report such as "Do you know your blood type?" "Are you suffering from a disease now or from a chronic disease?", as shown in FIG. 2, and the user replies "My blood type is B." "I have myocardial infarction." or the like.

The agent processing unit 11 stores as response data 305 the procedures of the user in response to the questions, and temporarily stores in a predetermined region of the RAM the replies by the user to the questions (Step 26).

The emergency reporting unit 21 detects the voice of the passenger via the mike 26, so that the agent processing unit 11 can proceed to the next question after the passenger has finished an answer.

Then, the agent processing unit 11 judges whether all the questions about the nature of the problem are finished (Step 27), and if there is a remaining question (N), the agent processing unit 11 returns to Step 25 to ask the next question.

On the other hand, when all the questions are completed (Step 27; Y), the agent processing unit 11 informs the passenger of the fact that the training has been finished, via the voice output device 25 and display device 27. In addition, the agent processing unit 11 evaluates an actual answer, based on the answers stored in the answer receiving means, and outputs, for example, a message "Please answer louder." when the passenger voice is too low to hear (Step 28).

While advice for response in the training is given after completion the training in this embodiment, it is also possible to give advice for every response of the passenger to each question.

For the evaluation, it is also possible to measure time from completion of each question to the answer as length of the answering time which is compared with a desired answering time as a training evaluation. It is also possible to set a desired answering time for each question and to make an evaluation by display in a graph the length of the answering time for each question, by using the length of an average answering time, or by both.

It is also possible to preset an average time from start to finish of the training for every emergency situation, so as to enable an evaluation using the length of the measured time from the start to the end of the training.

FIG. 7F is a view showing an example of an end screen that the agent processing unit 11 displays when ending the training.

On the end screen, the agent outputs a message such as "Good training today." which is displayed in a balloon. Further, the agent processing unit 11 outputs by voice and in a balloon the evaluation of the training session. Note that it is also possible to display and output by voice the notification of the end of the training mode and the evaluation separately.

As described above, the user can simulate and experience, by use of the training mode, the actual usage of the emergency reporting unit 21 in the imagined circumstances. A series of routines simulating the usage of the emergency reporting unit 21 is regarded as the training means of the present invention. Further, the storage of the results of the simulation of the emergency report as the response data 305 is regarded as the result storage means of the present invention.

After the evaluation of the training mode, the agent processing unit 11 displays a list of the replies (obtained as replies to the questions) stored in the RAM in Step 26, as shown in FIG. 7F. In this list, the obtained replies and the questions corresponding to the replies are displayed. Further, check boxes are displayed for the respective questions with checks placed in all the check boxes when the list is first displayed.

Then, the agent processing unit 11 outputs by voice and display as a balloon, for example, "I acquired the following passenger information. Please clear checks for data you don't register." so as to confirm whether the replies obtained in the training mode may be stored as passenger information 307 (Step 29).

The passenger clears checks in the check boxes for information different from his or her actual circumstances (chronic disease, family doctor, and so on) among the replies, to thereby give the agent processing unit 11 accurate information.

The agent processing unit 11 reads from the RAM the passenger information which has been confirmed by the passenger (the questions and replies having the check boxes with checks placed therein), stores the information as passenger information 307 together with the date and hour when the information is acquired (information update date and hour) (Step 30), and then ends the routine.

As described above, in the training mode, it is possible to obtain with ease from the replies to the questions the passenger information such as name, sex, age, blood type, illness or chronic disease, use of medication and types and names of medicines, any allergy, pre-existing injury or disability, hospital, family doctor, and so on.

It should be noted that, while the foregoing embodiment has been described as including the notification of the end of the training (Step 27), the evaluation of the training (Step 28), and the confirmation of the passenger information (Step 30) are performed in this order, these three steps may be performed in another order.

(iii) The Deputy Mode in the Emergency Report Mode

This deputy report mode is a mode wherein, when a reaction cannot be obtained from the user in an actual emergency, the emergency reporting apparatus is automatically activated and makes a deputy emergency report to provide, as a deputy for the passenger, the passenger information to rescue facilities, using the results learned from the past training (the response procedures and replies at the time of emergency).

Figure 8:
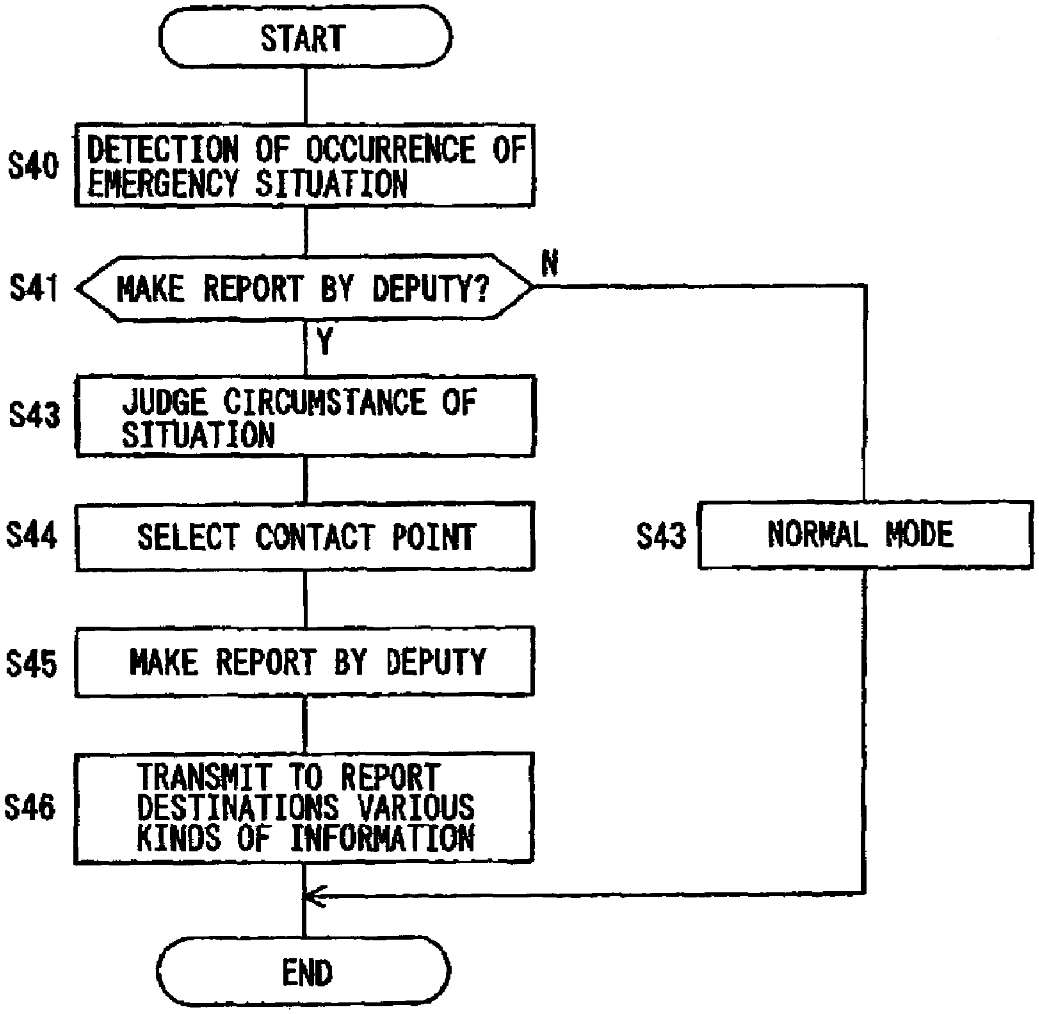
FIG. 8 is a flowchart of a deputy report program.

FIG. 8 is a flowchart of the deputy report mode, serving as a passenger information transmission means.

The passenger information transmission means transmits the stored passenger information to an emergency report destination when the detection means detects occurrence of an emergency situation, and is described more specifically below.

The agent processing unit 11 detects the occurrence of an emergency situation from the circumstances detector and emergency reporting apparatus (Step 40).

More specifically, the agent processing unit 11 may detect an emergency situation through deployment of an airbag caused by the collision sensor, operation as the emergency reporting switch of the emergency reporting unit 21 by the passenger, or the movement of people in the vehicle captured by the in-vehicle camera (imaging device 28).

Further, the agent processing unit 11 may be configured to detect an emergency situation in conjunction with the navigation apparatus (navigation processing unit 10).

For example, when the rudder angle sensor 413 detects through use of the maps stored in the navigation data that a vehicle has unnaturally meandered where the vehicle is on a straight road and thus the meandering is unnecessary, the agent processing unit 11 questions the passenger whether he or she wishes to make a report and whether an emergency situation has occurred, and judges from the replies whether there is an emergency situation. Unnatural meandering can be judged, for example, based on the number of times meandering during a predetermined period, the cycle of meandering, and so on.

Further, it is possible to detect an emergency situation using the present position detector when detecting a stop at a place where the vehicle would not stop under normal circumstances. The agent processing unit 11 detects, for example, a stop on a highway, a stop at a place other than a normal stop (in a traffic jam on an open road, waiting at a stoplight, at a parking lot, at a destination, at a place set as a stop by), and questions the passenger whether he or she wishes to make a report.

For detection of an emergency situation, the above methods may be used in combination. For example, in the case where the collision sensor 432 can distinguish between a strong collision (the airbag deploys) and a weak collision (no deployment), when the collision is detected as strong, the agent processing unit 11 immediately judges the situation to be an emergency, but when the collision is weak, the agent processing unit 11 judges whether the situation is an emergency by processing images obtained by the in-vehicle camera.

Further, when the vehicle stops at a place where the vehicle does not stop in normal circumstances, the agent processing unit 11 may judge it to be an emergency situation when detecting that the hazard switch sensor 431 has been on for a predetermined period or more.

When detecting an emergency situation, the agent processing unit 11 judges whether to make a report by use of its deputy function (Step 41).

More specifically, the agent processing unit 11 detects the state (condition) of the passenger based on the movement of people in the vehicle by processing the image captured by the in-vehicle camera of the imaging device 28. The agent processing unit 11 judges, for example, the state (condition) of the passenger, such as whether he or she can make report by himself or herself and whether he or she can move by himself or herself. The judgment criteria include movement (normal movement, no movement, convulsions, or the like), posture (normal, bending backward, crouch, or the like), or others (vomiting of blood, turning up of the whites of the eyes, foaming at the mouth, etc.).

Further, the agent processing unit 11 may allow the reporter to select whether the agent processing unit 11 should make a report by deputy function, through the conversation function of the agent. For example, when finding an abnormal condition of the reporter, the agent processing unit 11 asks questions such as "Can you make a report?" "Do you need a deputy report?" and so on, and detects from the replies whether to make a deputy report or to keep the normal mode.

When the passenger himself or herself judges that he or she can move but cannot converse well in (communication and dealing with a report facility), and pushes the emergency reporting switch, the agent processing unit 11 judges that a deputy report is necessary and makes it. The judgment whether the passenger can communicate with the emergency responder, when the detection means detects an emergency situation as described above, is regarded as a function of capability judging means of the present invention.

When judging that a deputy report is unnecessary based on the report deputy judgment as described above (Step 41; N), the agent processing unit 11 operates processing in the normal mode which has been described in FIG. 5 (Step 42).

On the other hand, when judging that a deputy report is necessary (Step 41; Y), the agent processing unit 11 judges the circumstances of the emergency situation, that is, the type of emergency situation (accident, sudden illness, disaster, or the like), the number of passengers, who the passengers are, and so on (Step 43).

As for the type of emergency situation, the agent processing unit 11 judges whether the circumstance of the emergency situation is an accident or sudden illness, using various sensors, such as, for example, the in-vehicle camera, pulse sensor, infrared sensor, collision sensor, etc.

In other words, when the collision sensor (airbag detection sensor) is activated, the agent processing unit 11 judges that an accident has occurred. When detecting an abnormal condition of the passenger from the processing of images obtained by the in-vehicle camera or the value detected by the pulse sensor 435, the agent processing unit 11 judges that it is a sudden illness.

Because, in the case of an accident, the collision sensor 432 detects an impact and automatically makes an emergency report, when the emergency switch is pushed by a passenger, the emergency is judged to be a sudden illness.

Further, when detecting, in conjunction with the navigation apparatus, an emergency situation in Step 40, the agent processing unit 11 judges that it is a sudden illness.

The agent processing unit 11 need not always determine an emergency based on a single circumstance and may make such a determination based on a plurality of circumstances as in the case of an accident with an injury. Especially when the agent processing unit 11 judges the situation to be an accident through the collision sensor 432 is there a possibility that the passenger might be injured. Thus, the agent processing unit 11 necessarily asks questions for confirmation of the circumstance by processing images obtained by the in-vehicle camera and by voice, and judges the situation to be a sudden illness (injury) in accordance with the replies.

The agent processing unit 11 is configured to detect as many details about the accident or sudden illness as possible. The agent processing unit 11 also detects details concerning the type of accident such as a vehicle collision, skidding, a fall, or the like, regarding a passenger, and consciousness, body temperature drop as measured by the infrared sensor, convulsions, and so on in the case of a sudden illness.

The number of passengers is detected by one or more of the in-vehicle camera, load sensor, infrared sensor, and so on.

The in-vehicle camera detects, by image processing, the presence of people in a vehicle.

The load sensor 434 judges from the detection value for load whether a person is on each seat to determine the number of users.

The infrared sensor 433 detects the number of people in the vehicle by detecting body temperature.

It is also possible to detect the number of people from a reply to a question of confirming the number of people such as "Do you have fellow passengers?" Giving the question for identifying the fellow passengers makes it possible to identify personal information (passenger information) for the fellow passengers and, when identified, to also report the personal information of the fellow passengers.

As described above, the confirmation of the number of parties concerned makes it possible to transmit to rescue facilities the appropriate number of rescue vehicles and rescue crews, and to prevent malfunction of the reporting apparatus when the parties concerned cannot be detected.

Next, the agent processing unit 11 selects a contact point in accordance with the circumstance of the emergency situation (Step 44), and makes a report to the selected contact point (Step 45).

More specifically, the agent processing unit 11 makes a report to the fire station when the emergency situation is a sudden illness (including injury), and to the police station in the case of an accident.

Besides, in the case of an emergency report via the center (emergency report service facility) shown in FIG. 4A, the agent processing unit 11 makes the report to the center.

Other possible report destinations (contact points) include home, company, and so on. These are destinations for the information acquired for the cases of accident, sudden illness, and so on in the training mode. When these report destinations such as home and so on are stored in the passenger information 307, the agent processing unit 11 also reports to the contact points in accordance with the circumstance of the emergency situation.

Next, the agent processing unit 11 transmits to the report destinations the various items of information which are stored in the passenger information 307 in the training mode (Step 46).

As for the transmission of the passenger information, since the circumstance of the emergency situation has been detected in the circumstance detection step (Step 43), the agent processing unit 11 transmits the information for an accident when detecting an accident, and the information for the case of a sudden illness when detecting a sudden illness.

Since the destinations of information at the time of both accident and sudden illness are stored in the training mode, the agent processing unit 11 transmits the information to the corresponding report destinations. The agent processing unit 11 can also transmit the information, not only to one report destination, but also to a plurality of report destinations at the same time.

The report of this agent processing unit 11 reflects the stored passenger information 307 as the report content. On the other hand, if the learning of the passenger information is insufficient, the agent processing unit 11 reports only that learned information.

Note that the procedures by which the passenger actually dealt are stored as response data 305 for every training item in the training mode. Therefore, when reporting by deputy, the agent processing unit 11 reports in accordance with the procedures, stored in the response data 305 in the training mode and corresponding to the circumstance of the emergency situation which has been judged in Step 43. Consequently, even when the user falls into a state unable to operate the emergency reporting apparatus, he or she can automatically obtain the benefit of the emergency reporting apparatus in accordance with his or her desired procedures.

FIG. 9 shows the contents of a deputy report.

As shown in FIG. 9, the information to be reported includes reporter name, accident occurrence time, accident occurrence place, passenger information, report reason, state, and so on.

In short, as a reporter, the apparatus reports by deputy function, or by the actual passenger reports.

The accident occurrence time is obtained from the navigation apparatus (navigation processing unit 10). Alternatively, the agent processing unit 11 may detect the time of occurrence of the emergency situation and report the time.

As for the location of the accident, the location of the accident detected by the present position detector is obtained from the navigation processing unit 10.

The passenger information is acquired from the passenger information 307.

As the report reason, the reason such as an accident, a sudden illness, or the like is transmitted.

As the state, the present state of the vehicle and passenger detected in Step 43 is transmitted. For example, the state to be transmitted includes the state of the vehicle (stop, collision, fall, or the like) in the case of an accident, and the state of the passenger (with or without consciousness, with or without movement, drop in body temperature, and so on) in the case of a sudden illness.

When reporting the passenger information in accordance with the contents shown in FIG. 9, the agent processing unit 11 outputs by voice the questions from the report destination and the report contents from the emergency reporting apparatus. The agent processing unit 11 communicates (the response contents between the report destination and the emergency reporting apparatus) by voice during the report and outputs the voice from the in-vehicle speaker, so that the passenger can recognize that a reliable report has been made and seizes the transmitted information. The voice output in the vehicle of the passenger information transmitted to the emergency report destination is regarded as a function of voice output means of the present invention.

As has been described, according to the emergency reporting apparatus of this embodiment, the training mode allows the passenger to experience, through simulation, dealing with an emergency situation, so that the passenger becomes capable of using the emergency reporting apparatus appropriately and calmly at the time of an actual emergency. Further, the simulation of the emergency report prevents the passenger from forgetting to use the apparatus at the time of an actual accident.

Furthermore, since the various types of information for the passenger, which needs to be reported at the time of an emergency report, are automatically acquired and stored in the training mode, the user can omit the work of intentionally inputting his or her information.

Moreover, the passenger information is stored in the training mode, so that when the passenger is unconscious at the time of an actual emergency situation, a report can be made based on the stored information.

While one embodiment of the present invention has been described, the present invention is not limited to the above described embodiment, but can be changed and modified within the scope of the claims.

For example, in the case of a deputy report, the apparatus responds by voice to the emergency responder, the apparatus may transmit all at once to the emergency responder (the report destination) the data for the passenger information corresponding to the emergency situation acquired in the training mode. In this case, what data are transmitted may be outputted by voice in the vehicle. This makes the passenger recognize that a reliable report has been made and feel safe.

To the report destination, both voice and data may be transmitted. In other words, to the report destination, the apparatus responds by voice using the passenger information and transmits all at once the data for content of the passenger information corresponding to the emergency situation.

If a police station, company, or home, is designated as an emergency report destination, the passenger information cannot be received as data, in which case, the data may be converted into a written form and transmitted by facsimile machine as well. Further, the data for the passenger information may be converted into voice and transmitted via a general telephone line as well.

While in the above-described embodiment the training mode is implemented when selected by the user, the agent processing unit 11 may discriminate between already acquired passenger information and unacquired (untrained) information, suggest the user change the training items, and urge the user to implement the training mode (suggestion means for suggesting items corresponding to an emergency situation).

More specifically, the agent processing unit 11 manages what training the user has received in the past, what kind of passenger information is absent at present, and so on, to urge the user to accept the "suggestion" for further training, and as a result the agent processing unit 11 can acquire more efficiently the absent passenger information. For example, when training for sudden illness is selected when such training has already been completed, the agent processing unit 11 suggests that "You haven't trained for the case of an accident yet, so I suggest accident training." Further, the agent processing unit 11 is configured to suggest that "There is a training mode for dealing with an emergency occurrence. Would you like to practice it?" when the training mode has not been implemented at all or after a lapse of a certain period.

The agent processing unit 11 may be configured to manage the contents of the passenger information 307 so as to update the information for "disease" and "injury" based on communication between the agent and the user executed in accordance with various scenarios. For example, the agent processing unit 11 may ask the question "By the way, have you recovered from the last injury (illness)?" to update the data.

Further, when judging that there is a change of the family doctor from the conversation with the user, the agent processing unit 11 may question whether the learned information is to be changed, and update the data in accordance with the reply. For example, the agent processing unit 11 may ask the question "Did you recently go to a doctor different from the doctor you previously used? Did you change your doctor? (If so,) May I update your information for use in a deputy emergency report?" and so on. The identity of his or her doctor can also be judged from the setting of a destination in the navigation processing and the location where the vehicle stops.

Further, the agent processing unit 11 may automatically update the age of the user soon after his or her birthday.

What is claimed is:

1. An emergency reporting apparatus which reports an emergency situation involving a vehicle or a passenger within the a vehicle to an emergency report destination, comprising:

training means for simulating an emergency situation and report to an emergency report destination;

passenger information storage means for storing information pertaining to the passenger;

wherein said training means comprises:

suggestions means for suggesting different types of emergency situations;

selecting means for selecting an emergency situation suggested by said suggestion means; and question means for outputting one or more questions corresponding to the emergency situation selected by said selection means; and wherein said suggestion means selects the suggested emergency situations based on the passenger information stored in said passenger information storage means.

2. The emergency reporting apparatus according to claim 1, further comprising:

answer receiving means for receiving an answer to the question by said question means; and a training evaluation means for outputting an evaluation of the answer received by said answer receiving means.

3. The emergency reporting apparatus according to claim 1, further comprising:

present position information detection means for detecting information pertaining to a present location of the vehicle, wherein said suggestion means, in selecting the suggested emergency situations, also refers to the present position information detected by said present position information detection means.

4. The emergency reporting apparatus according to claim 1, further comprising:

result storage means for storing results obtained in simulation by said training means, wherein said suggestion means, in selecting the suggested emergency situations, also refers to the results obtained in simulation and stored in said result storage means.

5. The emergency reporting apparatus which reports an emergency situation, involving a vehicle or a passenger within the a vehicle, to an emergency report destination, comprising:

training means for simulating an emergency situation and report to the emergency report destination:

passenger information storage means for storing as, passenger information, results obtained in simulation by said training means;

detection means for detecting an occurrence of an emergency involving the vehicle or the passenger; and passenger information transmission means for transmitting to the emergency report destination, the passenger information stored in said passenger information storage means, when said detection means detects the occurrence of the emergency situation.

6. The emergency reporting apparatus according to claim 5, further comprising:

response capability judging means for judging whether the passenger is capable of responding to the emergency report destination, when said detection means detects the occurrence of the emergency situation, wherein said passenger information transmission means transmits the passenger information when said response capability judging means judges that the passenger is incapable of responding.

7. The emergency reporting apparatus according to claim 5, wherein said training means comprises:

question means for outputting one or more questions simulating an emergency situation; and answer receiving means for receiving an answer to the question output by said question means, wherein said passenger information storage means stores the answer to the question received by said answer receiving means.

8. The emergency reporting apparatus according to claim 5, wherein said passenger information transmission means comprises a voice output means for outputting by voice in the vehicle the passenger information transmitted to the emergency report destination.

* * * * *

UNITED STATES PATENT AND TRADEMARK OFFICE

CERTIFICATE OF CORRECTION

PATENT NO. : 7,044,742 B2
APPLICATION NO. : 10/328021
DATED : May 16, 2006
INVENTOR(S) : Koji Sumiya et al.

It is certified that error appears in the above-identified patent and that said Letters Patent is hereby corrected as shown below:

On the Title Page:

“Assignee: Kabushikikaisha Equos Research, Tokyo (JP)”

should read:

-- Assignees:; Kabushikikaisha Equos Research, Tokyo (JP)” and
Kabushikikaisha Shinsangyokaihatsu, Tokyo (JP) --

Under the heading “FOREIGN PATENT DOCUMENTS”, add:

-- JP 05-005626 1/1993 --

Signed and Sealed this

Twenty-sixth Day of February, 2008

JON W. DUDAS
*Director of the United States Patent and Trademark Office*